United States Patent
Hoelzl

(10) Patent No.: US 10,451,176 B2
(45) Date of Patent: Oct. 22, 2019

(54) PLANETARY GEARING FOR A WIND TURBINE HAVING MOUNTED PLANETARY GEARS

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 15/758,767

(22) PCT Filed: Sep. 15, 2016

(86) PCT No.: PCT/EP2016/071749
§ 371 (c)(1),
(2) Date: Mar. 9, 2018

(87) PCT Pub. No.: WO2017/046194
PCT Pub. Date: Mar. 23, 2017

(65) Prior Publication Data
US 2018/0299006 A1 Oct. 18, 2018

(51) Int. Cl.
*F16H 57/08* (2006.01)
*F16C 33/08* (2006.01)
(Continued)

(52) U.S. Cl.
CPC ............ *F16H 57/082* (2013.01); *F16C 17/10* (2013.01); *F16C 33/1055* (2013.01);
(Continued)

(58) Field of Classification Search
CPC ........................... F16H 2057/085; F16C 33/08
See application file for complete search history.

(56) References Cited

U.S. PATENT DOCUMENTS

| 2012/0051915 A1 | 3/2012 | Suzuki et al. |
| 2012/0108380 A1 | 5/2012 | Dinter et al. |
(Continued)

FOREIGN PATENT DOCUMENTS

| AT | 512436 A1 * | 8/2013 | ............ F16C 35/02 |
| CA | 2926220 A1 * | 4/2015 | ........... F16H 57/082 |
(Continued)

OTHER PUBLICATIONS

International Search Report of PCT/EP2016/071749, dated Dec. 20, 2016.

*Primary Examiner* — Tisha D Lewis
(74) *Attorney, Agent, or Firm* — Collard & Roe, P.C.

(57) ABSTRACT

The invention relates to a planetary gearing (1) for a wind turbine, comprising a sun gear (3), a hollow gear (17), a planetary carrier (9) with a first bolt receiving element (10) having at least one first bolt seat (12), at least one planetary gear bolt (8) and at least one planetary gear (5). The bearing assembly (19) has a first planetary gear receiving bushing (20) and a second planetary gear receiving bushing (21), which planetary gear receiving bushings (20, 21) are coupled to the planetary gear (5) in a rotationally fixed manner, and between which planetary gear receiving bushings (20, 21) an axial bearing gap (25) is formed. The bearing assembly (19) has at least one bearing running sleeve (28), which is accommodated on the planetary wheel bolt (8) in a rotationally fixed manner, and on which an axial positioning flange (29) is formed, which is accommodated in the axial bearing gap (25) between the planetary gear receiving bushings (20), and an axial position fixing, in particular an axial bearing, of the planetary gear (5) on the planetary gear bolt (8) is thereby carried out.

8 Claims, 4 Drawing Sheets

(51) Int. Cl.
*F16C 35/02* (2006.01)
*F16C 43/02* (2006.01)
*F16C 17/10* (2006.01)
*F16C 33/10* (2006.01)
*F16C 17/26* (2006.01)

(52) U.S. Cl.
CPC .............. *F16C 35/02* (2013.01); *F16C 43/02* (2013.01); *F16C 17/26* (2013.01); *F16C 33/08* (2013.01); *F16C 2226/50* (2013.01); *F16C 2226/52* (2013.01); *F16C 2360/31* (2013.01); *F16H 2057/085* (2013.01)

(56) References Cited

U.S. PATENT DOCUMENTS

2012/0114488 A1    5/2012    Giger
2014/0378261 A1    12/2014    Kari
2015/0133260 A1    5/2015    Van Den Donker et al.
2015/0345591 A1*   12/2015    Altamura ............ F16H 57/0479
                                                                    475/159
2015/0369352 A1*   12/2015    Hager .................... F16C 17/04
                                                                     74/433

FOREIGN PATENT DOCUMENTS

| | | |
|---|---|---|
| CN | 102575750 A | 7/2012 |
| CN | 103791039 A | 5/2014 |
| DE | 10 2011 087 568 A1 | 6/2013 |
| DE | 10 2012 213 971 A1 | 5/2014 |
| EP | 2 383 480 A1 | 11/2011 |
| EP | 2 662 598 A1 | 11/2013 |
| GB | 2 010 415 A | 6/1979 |
| WO | 2009/141140 A2 | 11/2009 |
| WO | 2013/106878 A1 | 7/2013 |

\* cited by examiner

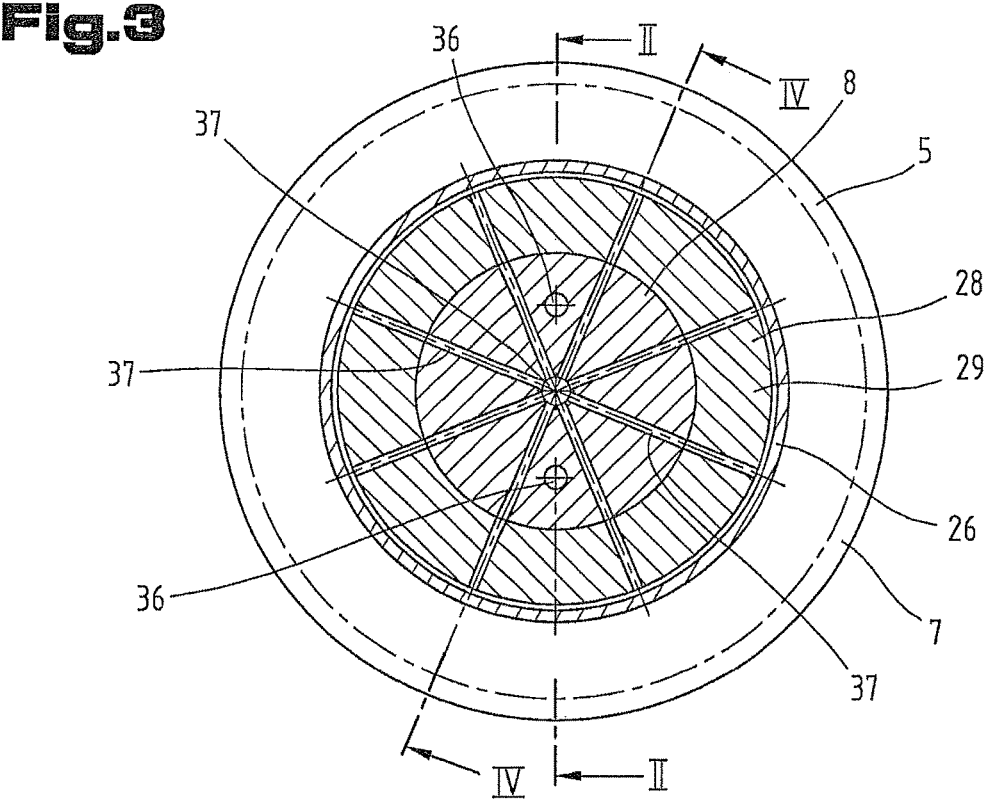
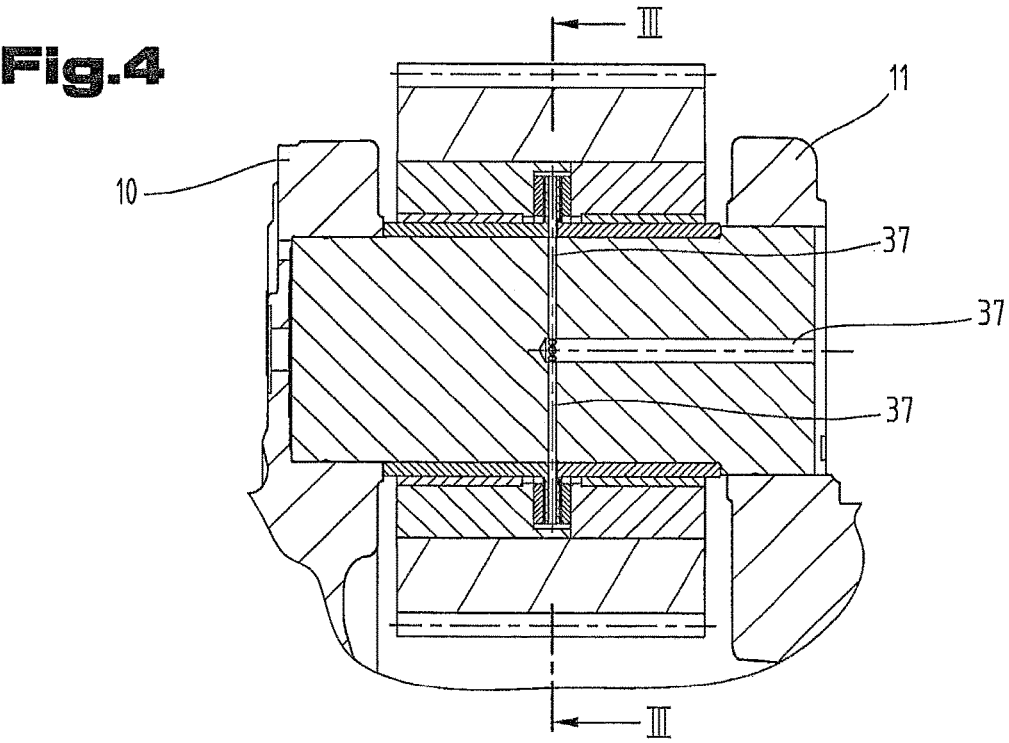

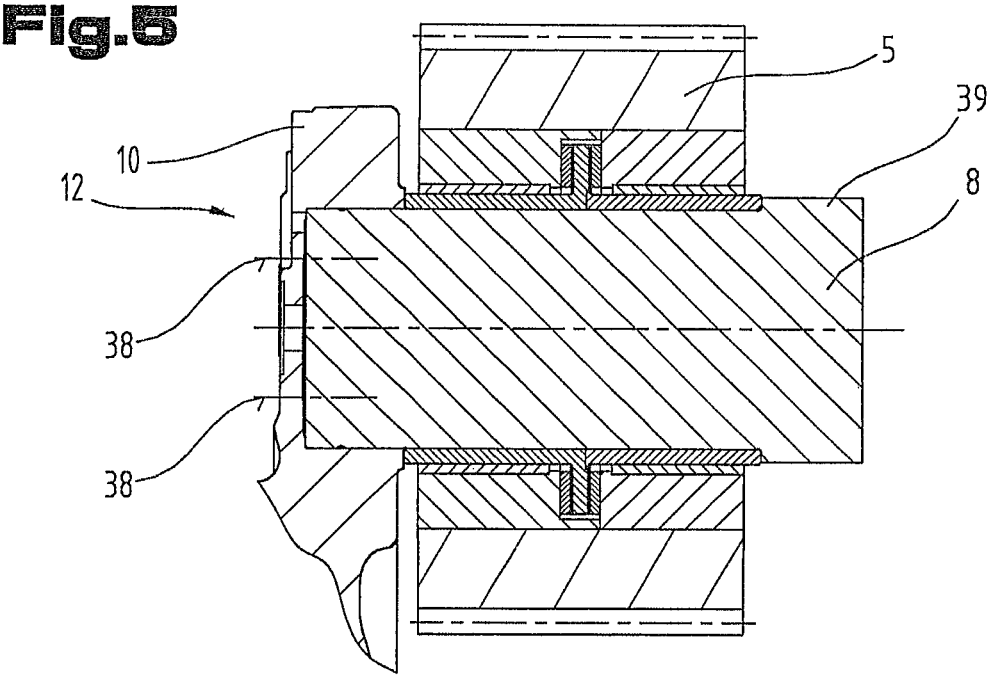
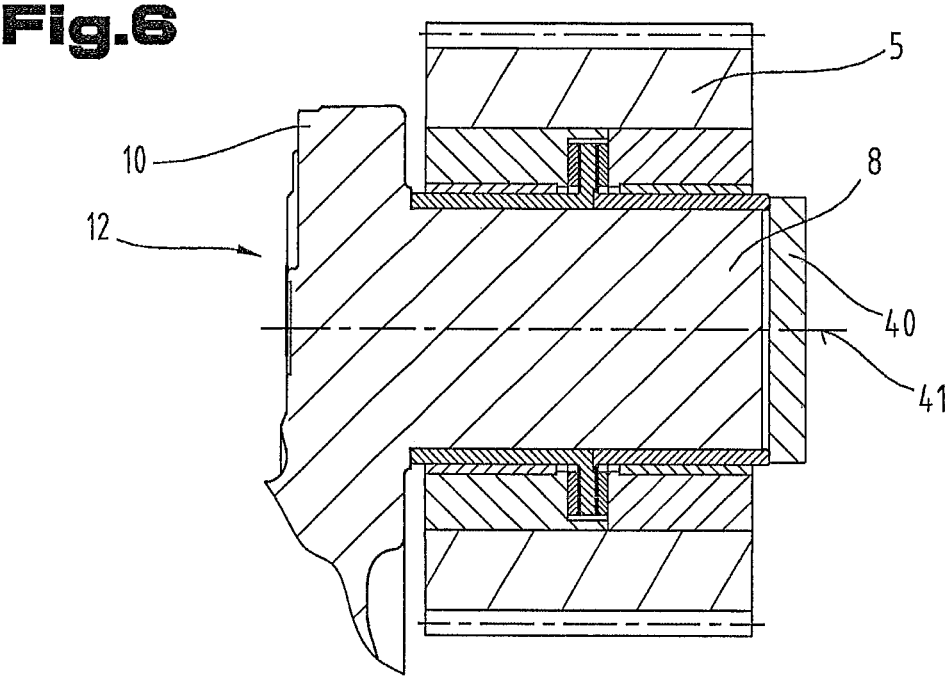

PLANETARY GEARING FOR A WIND TURBINE HAVING MOUNTED PLANETARY GEARS

CROSS REFERENCE TO RELATED APPLICATIONS

This application is the National Stage of PCT/EP2016/071749 filed on Sep. 15, 2016, which claims priority under 35 U.S.C. § 119 of Austrian Application No. 50789/2015 filed on Sep. 15, 2015, the disclosure of which is incorporated by reference. The international application under PCT article 21(2) was not published in English.

The invention relates to a planetary gearing and to a wind turbine fitted with the planetary gearing.

A generic planetary gearing is known from WO2013/106878A1 of the same applicant. In this document a sliding bearing is arranged between a planetary shaft and the planetary carrier, wherein the planetary gear is connected to the planetary shaft in a rotationally secure manner. For the axial bearing of the planetary gear two run-on discs are provided, which are arranged on both sides of the planetary gear between the planetary gear and planetary carrier.

The underlying objective of the invention is to provide a planetary gearing with improved bearing of the planetary gear.

Said objective of the invention is achieved by the planetary gearing as claimed in claim 1.

According to the invention a planetary gearing for a wind turbine is formed. The planetary gearing comprises a sun gear, a hollow gear, a planetary carrier with a first bolt receiving element, which comprises at least one first bolt seat and at least one planetary gear bolt, which is mounted in the first bolt seat in a rotationally secure manner, at least one planetary gear, which is mounted rotatably on the planetary gear bolt by means of a bearing assembly relative to the planetary gear bolt, wherein the planetary gear is in engagement both with the sun gear and with the hollow gear. The bearing assembly comprises a first planetary gear receiving bushing and a second planetary gear receiving bushing, which planetary gear receiving bushings are coupled to the planetary gear in a rotationally secure manner and between which planetary gear receiving bushings an axial bearing gap is formed. The bearing assembly comprises at least one bearing running sleeve, which is mounted on the planetary gear bolt in a rotationally secure manner and on which an axial positioning flange is formed, which is mounted in the axial bearing gap between the planetary gear receiving bushings and in this way an axial position fixing, in particular an axial bearing, of the planetary gear on the planetary gear bolt is carried out.

The design of the planetary gearing according to the invention has the advantage that the axial bearing of the planetary gear is arranged in the planetary gearing in a space-saving manner and that a planetary gearing designed in this way, in particular a planetary gear, is easy to maintain. Furthermore, it is also possible that in an existing planetary gearing an originally provided roller bearing can be replaced by a sliding bearing designed in this way.

Furthermore, it can be advantageous that the bearing assembly comprises a first radial sliding bearing bush which is mounted in the first planetary gear receiving bushing in a rotationally secure manner and comprises a second radial sliding bearing bush, which is mounted in the second planetary gear receiving bushing in a rotationally secure manner, wherein the first and the second radial sliding bearing bush have a sliding surface for the relative movement on a contact surface with the bearing running sleeve. Such a sliding bearing bush can be easily replaced in case of wear and such sliding bearing bushes can be produced so that they are adapted to the requirements of the respective planetary gearing.

Furthermore, the bearing assembly can comprise a first axial sliding bearing disc which is arranged between the first planetary gear receiving bushing and axial positioning flange of the bearing running sleeve and the bearing assembly comprises a second axial sliding bearing disc, which is arranged between the second planetary gear receiving bushing and axial positioning flange of the bearing running sleeve. By means of this arrangement of axial sliding bearing discs the planetary gear can be operated more easily and it is possible that axial forces can be also transmitted in the bearing assembly, for example by means of a helical gearing in the planetary gear.

Furthermore, it is possible that the first axial sliding bearing disc is secured by fastening means onto the first planetary gear receiving bushing and that the second axial sliding bearing disc is secured by fastening means onto the second planetary gear receiving bushing. It is an advantage here that the axial sliding bearing discs can be mounted securely inside the bearing assembly and thus the sliding surfaces of the axial sliding bearing discs can be predetermined exactly.

Furthermore, it is possible for the planetary carrier to comprise a second bolt receiving element on which at least one second bolt seat is formed, wherein the planetary gear is arranged on the planetary gear bolt between the first bolt seat and second bolt seat. The advantage of this is that in this way the planetary gear bolt can be supported on both sides. This results in the increased rigidity of the whole system and thus a reduction of vibrations during the operation of the planetary gearing.

An embodiment is also advantageous in which the bearing running sleeve comprises a first bearing running sleeve part and a second bearing running sleeve part, wherein on one of the two bearing running sleeve parts the axial positioning flange is formed at the end side and the two bearing running sleeve parts are positioned relative to one another so that the axial positioning flange is arranged on the interior between the two bearing running sleeve parts. It is an advantage here that the bearing miming sleeve can be produced simply and inexpensively by the divided design and furthermore the installation of the bearing sleeve can be made easier.

According to one development it is possible that at least one of the planetary gear receiving bushings comprises a graduation on an end side which forms the axial bearing gap, wherein the two planetary gear receiving bushings contact one another at an end face. It is an advantage, here that in this way the axial extension of the axial bearing gap can be defined precisely. In this way an axial bearing play can be determined.

Furthermore, it can be an advantage that in the planetary gear bolt at least one lubricant inlet is formed, which is guided in the area of the bearing running sleeves out of the planetary gear bolt and that in the planetary gear bolt also at least one lubricant outlet is formed which opens into the planetary gear bolt in the area of the axial positioning flange. It is an advantage hereby that by means of the lubricant inlet and the lubricant outlet the axial bearing and radial bearing can be lubricated specifically by means of an external lubricant supply.

For a better understanding of the invention the latter is explained with reference to the following Figures.

In a much simplified, schematic view:

FIG. 3 is a cross-sectional view of the planetary carrier according to the section line III-III of FIG. 2;

FIG. 4 is a cross-sectional view of the planetary carrier according to the section line IV-IV of FIG. 3;

FIG. 5 is a cross-sectional view of a planetary carrier with an overhanging planet bolt;

FIG. 6 is a cross-sectional view of a planetary carrier with an integrated planet bolt.

Figure 1:
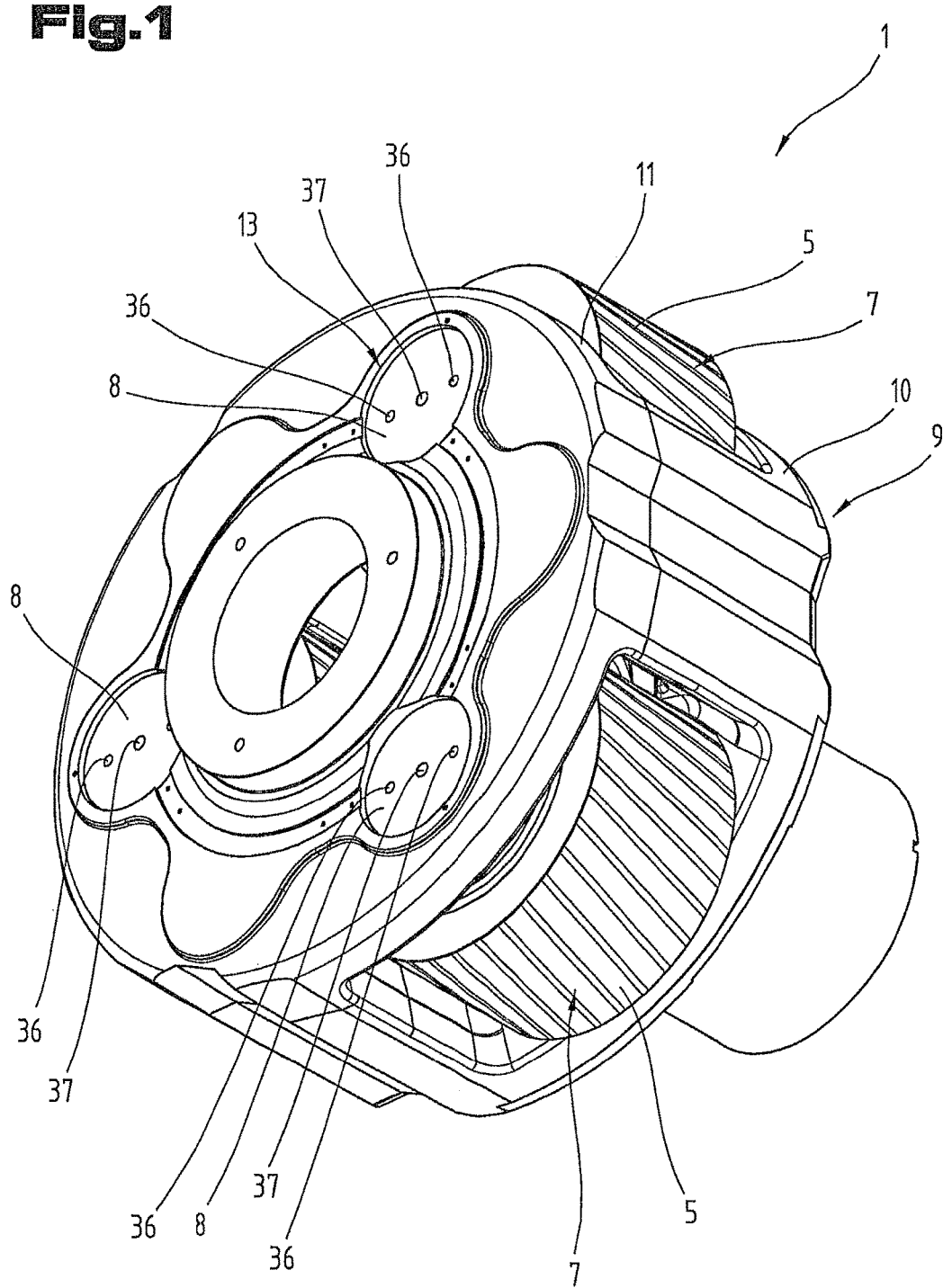
FIG. 1 is a perspective view of an embodiment of a planetary carrier for a planetary gearing.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 2:
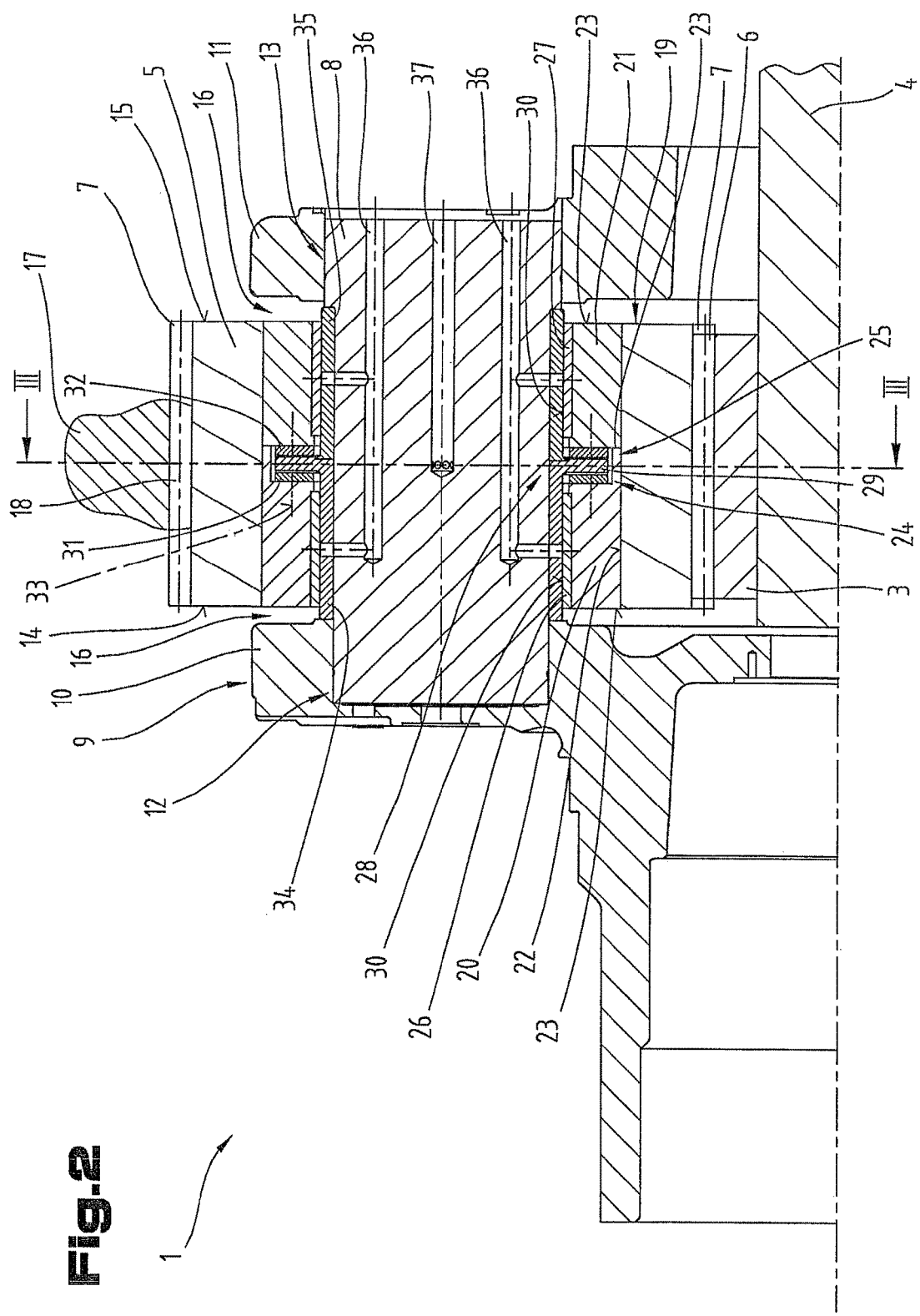
FIG. 2 is a cross-sectional view of the planetary carrier according to the section line II-II of FIG. 3.

FIG. 1 is a perspective view of the interior of a planetary gearing 1 for a wind turbine. FIG. 2 shows a cross-section of the planetary gearing 1, wherein for a better overview only a portion of the planetary gearing 1 above a central axis 2 is shown.

The following description of the structure of the planetary gearing 1 is based on an overview of FIGS. 1 and 2.

It is known that wind turbines comprise a tower with a gondola arranged at the upper end in which the rotor with rotor blades is mounted. Said rotor is operatively connected via the planetary gearing 1 to a generator, which is also located in the gondola, wherein by means of the planetary gearing 1 the low speed of the rotor is converted into a higher speed of the generator rotor. As such designs of wind turbines are found in the prior art, reference is made here to the relevant literature.

The planetary gearing 1 comprises a sun gear 3, which is coupled with movement to a shaft 4, which leads to the generator rotor. The sun gear 3 is surrounded by a plurality of planetary gears 5, for example two, preferably three or four. Both the sun gear 3 and the planetary gears 5 have external spur gearings 6, 7, which intermeshing with one another, wherein said spur gearings 6, 7 are shown schematically in FIG. 2.

The planetary gears 5 are mounted by means of planetary gear bolts 8 in a planetary carrier 9, wherein in the planetary carrier 9 a first bolt receiving element 10 and a second bolt receiving element 11 are provided. In the bolt receiving elements 10, 11 a first bolt seat 12 and a second bolt seat 13 are formed in which the planetary gear bolt 8 is mounted. The planetary gear bolt 8 can be secured in the planetary carrier 9 by additional securing means, such as fastening means for example.

The planetary carrier 9, in particular the bolt receiving elements 10, 11 can be made in one piece from a cast material piece.

In an alternative variant it is also possible for the second bolt receiving element 11 to be secured by fastening means onto the first bolt receiving element 10 and the two bolt receiving elements 10, 11 can thus be disassembled. Furthermore, guide pins can be provided, by means of which the position of the second bolt receiving element 11 is fixed relative to the first bolt receiving element 10.

As shown particularly clearly in FIG. 2, the first bolt seat 12 can be designed in the form of a blind bore and the second bolt seat 13 is designed in the form of a through bore. Thus the planetary gear bolt 8 can be inserted from the side of the second bolt seat 13 into the two bolt receiving elements 10, 11.

Furthermore, it is also shown that the planetary gear 5 is mounted approximately centrally between the two bolt receiving elements 10, 11, wherein an axial free space 16 is formed between a first end face 14 of the planetary gear 5 and the first bolt receiving element 10 and also between a second end face 15 of the planetary gear 5 and the second bolt receiving element 11, so that the planetary gear 5 can run freely in the planetary carrier 9.

On the outside of the planetary gears 5 a hollow gear 17 is arranged which has internal toothing 18 which intermeshes with the spur gearing 7 of the planetary gears 5. The hollow gear 17 is coupled with movement with a rotor shaft of the rotor of the wind turbine.

The spur gearings 6, 7 and the internal toothing 18 can be designed in the form of a spur gear, a helical gear or as a double helical gear for example.

As such planetary gearings 1 are also already known in principle from the prior art, for example from the aforementioned document of the prior art, no further explanation is necessary at this point.

It should be noted that the singular is used in the following when referring to the planetary gear 5. Of course, there can be plurality of planetary gears 5 according to the invention.

The planetary gear 5 is supported by means of a bearing assembly 19 on the planetary gear bolt 8 and in this way can be rotated relative to the planetary gear bolt 8. Furthermore, by means of the bearing assembly 19 it is possible for the axial free space 16 between the planetary gear 5 and the bolt receiving elements 10, 11 to also be maintained during operation and in this way the planetary gear 5 is freely rotatable.

The bearing assembly 19 comprises a first planetary gear receiving bushing 20 and a second planetary gear receiving bushing 21, which are mounted in a rotationally secure manner in the planetary gear 5. This can be achieved for example in that the planetary gear receiving bushings 20, 21 are inserted into an inner cylinder surface 22 of the planetary gear 5. The inner cylinder surface 22 of the planetary gear 5 can also comprise graduations which are used as a stop. In order to mount the planetary gear receiving bushings 20, 21 in the planetary gear 5 in a rotationally secure manner, it is possible for example for the latter to be mounted by means of a press fit in the planetary gear 5. In addition or alternatively, the planetary gear receiving bushings 20, 21 can be secured in the planetary gear 5 by means of fastening means, such as a setscrew. In a further variant the planetary gear receiving bushings 20, 21 can be secured in the planetary gear 5 by means of a material-bonded connection such as an adhesive bond or a weld.

Furthermore, it is possible that at least one of the two planetary gear receiving bushings 20, 21 has a graduation 24 on one end face 23, by means of which an axial bearing gap 25 is formed. The planetary gear receiving bushings 20, 21 are preferably designed in the form of a hollow cylinder, wherein the graduation 24 is formed in the inner cylinder surface of the planetary gear receiving bushing 20, 21. In particular, it is possible that end faces 23 of the planetary gear receiving bushings 20, 21 adjoin one another in the finally installed stated.

In a further not shown embodiment variant it is possible that a shoulder is arranged in the center of the cylinder surface 22 of the planetary gear 5, on which the planetary gear receiving bushings 20, 21 bear, whereby the axial bearing gap 25 is formed.

According to yet another embodiment variant one of the two planetary gear receiving bushings 20, 21 can be connected in one piece with the planetary gear 5, or one of the two planetary gear receiving bushings 20, 21 can be formed in one piece with the planetary gear 5.

Furthermore, on the inner casing surface of the first planetary gear receiving bushing 20 a first radial sliding bearing bush 26 can be mounted and on the inner casing surface of the second planetary gear receiving bushing 21 a second radial sliding bearing bush 27 can be arranged. The two radial sliding bearing bushes 26, 27 are preferably mounted by means of a press-connection in the planetary gear receiving bushings 20, 21. In this case the radial sliding bearing bushes 26, 27 are preferably mounted in a rotationally secure manner in the planetary gear receiving bushings 20, 21. In particular, a shoulder can be formed in the planetary gear receiving bushings 20, 21 on which shoulder the radial sliding bearing bushes 26, 27 are mounted. In this way the axial position of the radial sliding bearing bushes 26, 27 can be secured.

Furthermore, a bearing running sleeve 28 is provided which is preferably secured by means of a press-connection onto the planetary gear bolt 8. The bearing running sleeve 28 can also be secured in its seat on the planetary gear bolt 8. The bearing running sleeve 28 comprises an axial positioning flange 29 which is mounted in the axial bearing gap 25. By means of the axial positioning flange 29 and the axial bearing gap 25 the planetary gear 5 can be secured in its axial position.

As shown in FIG. 2 the first and the second radial sliding bearing bush 26, 27 can have a sliding surface 30, by means of which the latter bear on the bearing running sleeve 28 and whereby the sliding bearing of the planetary gear 5 is formed.

In a further embodiment variant, which is not shown, the sliding surface 30 can be arranged not on the inner cylinder surface of the radial sliding bearing bushes 26, 27 but it can be arranged on the outer cylinder surface of the radial sliding bearing bushes 26, 27. In such an embodiment variant the radial sliding bearing bush 26, 27 is pressed in a rotationally secure manner on the bearing running sleeve 28 and the relative movement takes place between the radial sliding bearing bush 26, 27 and the planetary gear receiving bushings 20, 21.

Furthermore, a first axial sliding bearing disc 31 can be arranged between the axial positioning flange 29 and the first planetary gear receiving bushing 20 and similarly a second axial sliding bearing disc 32 can be arranged between the axial positioning flange 29 and the second planetary gear receiving bushing 21.

In a first variant the axial sliding bearing discs 31, 32 can be arranged by means of fastening means 33 on the first or second planetary gear receiving bushing 20, 21. The relative movement thus takes place between the axial sliding bearing discs 31, 32 and the axial positioning flange 29. Such fastening means can consist of an Allen screw or countersunk screw for example.

Alternatively, it is possible to use an adhesive bond instead of fastening means 33 for securing the axial sliding bearing discs 31, 32 to the planetary gear receiving bushing 20, 21.

In a further embodiment variant, which is not shown, the axial sliding bearing discs 31, 32 can be secured to the axial positioning flange 29 by fastening means 33 or an adhesive bond and there can be a relative movement between the axial sliding bearing discs 31, 32 and the planetary gear receiving bushings 20, 21.

According to a further embodiment variant the axial sliding bearing discs 31, 32 can be fixed either by their outer or inner circumferential surface radially inside the axial bearing gap 25 and the axial sliding bearing discs 31, 32 can thus be inserted loosely in the axial bearing gap 25.

As shown in FIG. 2 the bearing running sleeve 28 can be formed by a first bearing running sleeve part 34 and a second bearing running sleeve part 35. Such an embodiment of the bearing running sleeve 28 has the advantage that the individual bearing running sleeve parts 34, 35 are simple to manufacture and can be installed separately from one another. With such a divided configuration the axial positioning flange 29 is formed on one of the bearing running sleeve parts 34, 35. The two bearing running sleeve parts 34, 35 are positioned relative to one another in the installed state so that the axial positioning flange 29 is arranged approximately in the center of the two bearing running sleeve parts 34, 35.

In a further embodiment, which is not shown, the bearing running sleeve 28 can have a similar form to the bearing running sleeve parts 34, 35 shown in FIG. 2 in a joined state, but is designed in one piece.

Furthermore, a lubricant inlet 36 can be formed in the planetary gear bolt 8, by means of which lubricant, such as oil, can be supplied to the sliding surfaces 30 of the two sliding bearing bushes 26, 27. In particular, the bearing running sleeve 28 can comprise at least one bore, which is congruent with the opening in the circumferential area of the planetary gear bolt 8 and thus the lubricant can be guided directly to the sliding surface 30. Furthermore, it is possible that several bores or openings of the lubricant inlet 36 are formed distributed around the circumference so that the radial sliding bearing bushes 26, 27 can be supplied with lubricant in several places.

To ensure that the bores in the bearing running sleeve 28 are congruent with the openings of the lubricant inlet 36 in the planetary gear bolt 8 it is possible to have a key or other formfitting connection for ensuring the rotationally secure connection between the bearing running sleeve 28 and planetary gear bolt 8.

Furthermore, a lubricant outlet 37 can be provided, by means of which the lubricant pushed into the axial bearing gap 25 can be removed from the axial bearing gap 25.

FIG. 3 shows a cross-sectional view of the planetary carrier according to the section line III-III of FIG. 2, wherein the same reference numerals and component names are used for the same parts as in the preceding FIGS. 1 to 2. To avoid unnecessary repetition reference is made to the detailed description of the preceding FIGS. 1 to 2.

FIG. 4 shows a cross-sectional view of the planetary carrier according to the section line IV-IV of FIG. 3, wherein the same reference numerals and component names are used for the same parts as in the preceding FIGS. 1 to 3. To avoid unnecessary repetition reference is made to the detailed description of the preceding FIGS. 1 to 3.

As show particularly clearly from an overview of FIGS. 3 and 4, in the area of the axial positioning flange 29 the lubricant outlet 37 is pulled outwards into preferably a plurality of openings. In particular, it is possible for the bearing running sleeve 28 to have radial bores in the area of the axial positioning flange 29, which bores are congruent with the lubricant outlet 37 of the planetary gear bolt and thus the lubricant can be removed from the axial bearing gap 25. By means of the described arrangement of the lubricant inlet 36 or the lubricant outlet 37 it is possible for both the radial sliding bearing bushes 26, 27 and also the axial sliding bearing discs 31, 32 to be supplied with sufficient lubricant.

The possible installation of such a planetary gear 5 into the planetary carrier 9 is now described with reference to FIG. 2.

In a first method step the first planetary gear receiving bushing 20 is pressed into the planetary gear 5 and secured if necessary. In a further method step the first radial sliding bearing bush 26 is then pressed into the first planetary gear receiving bushing 20. Alternatively, it is also possible for the first radial sliding bearing bush 26 to be already pressed with the first planetary gear receiving bushing 20 prior to inserting the first planetary gear receiving bushing 20 into the planetary gear 5.

In a further method step the first axial sliding bearing disc 31 is then inserted into the axial bearing gap 25. Now the bearing running sleeve 28 can be inserted into the first radial sliding bearing bush 26 so that the axial positioning flange 29 is mounted in the axial bearing gap 25.

In a further method step the second radial sliding bearing bush 27 can be pressed into the second planetary gear receiving bushing 21 and the second axial sliding bearing disc 32 can be positioned on the latter.

In a further method step the second planetary gear receiving bushing 21 can now be pressed into the planetary gear 5 and if necessary secured in the latter. In this way the planetary gear 5 forms a unit with the planetary gear receiving bushings 20, 21 of the bearing running sleeve 28 and the radial sliding bearing bushes 26, 27 arranged between the individual parts and axial sliding bearing discs 31, 32.

In a further method step said unit can now be inserted into the planetary carrier 9 and the planetary gear bolt 8 can be pushed from the side of the second bolt seat 13 into the two bolt seats 12, 13 and can then be secured as necessary.

FIG. 5 shows a further and possibly independent embodiment of the planetary gearing 1, wherein the same reference numerals and component names are used for the same parts as in the preceding FIGS. 1 to 4. To avoid unnecessary repetition reference is made to the detailed description in the preceding FIGS. 1 to 4.

In the embodiment variant according to FIG. 5 only the first bolt receiving element 10 is provided for receiving the planetary gear bolt 8. In other words the planetary gear bolt 8 is mounted in an overhanging manner in the first bolt seat 12. Also in this embodiment variant the planetary gear bolt 8 is mounted in a rotationally secure manner in the first bolt seat 12.

To secure the planetary gear bolt 8 in the first bolt receiving element 10 one or more fastening elements 38 can be provided. The fastening elements 38 can be designed in the form of screws for example. Furthermore, it is possible for the planetary gear bolt 8 to have a shoulder 39. In particular, it is possible that the bearing running sleeve parts 34, 35 are clamped between the shoulder 39 and the first bolt receiving element 10. This type of clamping can be achieved by tightening the fastening elements 38.

FIG. 6 shows a further and possibly independent embodiment of the planetary gearing 1, wherein the same reference numerals and component names are used for the same parts as in the preceding FIGS. 1 to 5. To avoid unnecessary repetition reference is made to the detailed description in the preceding FIGS. 1 to 5.

In the further embodiment variant according to FIG. 6 the planetary gear bolt 8 is designed in one piece or integrally with the first bolt receiving element 10. In such an embodiment variant the first bolt seat 12 is formed by the material-bonded connection.

To be able to secure the bearing running sleeve parts 34, 35 onto the planetary gear bolt 8 an axial securing element 40 can be provided, by means of which the bearing running sleeve parts 34, 35 can be clamped. The axial securing element 40 can be designed as shown in the form of a disc, which can be secured by means of a further fastening means 41, such as a screw, onto the planetary gear bolt 8.

According to one embodiment variant, which is not shown, it is also possible for the axial securing element 40 to be designed in the form of a shaft nut, which is screwed directly onto the planetary gear bolt 8.

According to a further embodiment variant, which is not shown, it is also possible for the axial securing element 40 to be designed in the form of an axial securing ring, which is secured directly onto the planetary gear bolt 8. Of course, other forms of axial securing elements 40 can also be used.

Similarly to the embodiments according to FIGS. 1 to 4 in the embodiments according to FIGS. 5 and 6 a lubricant supply can be formed in the planetary gear bolt 8.

Furthermore, individual features of combinations of features of the various shown and described different embodiments can represent in themselves independent solutions according to the invention.

The problem addressed by the independent solutions according to the invention can be taken from the description.

Mainly the individual embodiments shown in FIGS. 1, 2, 3, 4, 5, 6 can form the subject matter of independent solutions according to the invention. The objectives and solutions according to the invention relating thereto can be taken from the detailed descriptions of these figures.

Finally, as a point of formality, it should be noted that for a better understanding of the structure of the individual parts the latter have not been represented true to scale in part and/or have been enlarged and/or reduced in size.

| LIST OF REFERENCE NUMERALS | |
|---|---|
| 1 | planetary gearing |
| 2 | central axis of planetary gearing |
| 3 | sun gear |
| 4 | shaft |
| 5 | planetary gear |
| 6 | spur gearing of sun gear |
| 7 | spur gearing of planetary gear |
| 8 | planetary gear bolt |
| 9 | planetary carrier |
| 10 | first bolt receiving element |
| 11 | second bolt receiving element |
| 12 | first bolt seat |
| 13 | second bolt seat |
| 14 | first end face of planetary gear |
| 15 | second end face of planetary gear |
| 16 | axial free space |
| 17 | hollow gear |
| 18 | internal toothing |
| 19 | bearing assembly |
| 20 | first planetary gear receiving bushing |
| 21 | second planetary gear receiving bushing |
| 22 | cylinder surface of planetary gear |
| 23 | end face |
| 24 | graduation |
| 25 | axial bearing gap |
| 26 | first radial sliding bearing bush |
| 27 | second radial sliding bearing bush |
| 28 | bearing running sleeve |

LIST OF REFERENCE NUMERALS

| | |
|---|---|
| 29 | axial positioning flange |
| 30 | sliding surface |
| 31 | first axial sliding bearing disc |
| 32 | second axial sliding bearing disc |
| 33 | fastening means |
| 34 | first bearing running sleeve part |
| 35 | second bearing running sleeve part |
| 36 | lubricant inlet |
| 37 | lubricant outlet |
| 38 | fastening element |
| 39 | shoulder |
| 40 | axial securing element |
| 41 | additional fastening means |

The invention claimed is:

1. A planetary gearing for a wind turbine, comprising:
a sun gear,
a hollow gear,
a planetary carrier with a first bolt receiving element which comprises at least one first bolt seat,
at least one planetary gear bolt which is mounted in the first bolt seat in a rotationally secure manner,
at least one planetary gear, which is mounted on the planetary gear bolt in a rotationally secure manner by a bearing assembly relative to the planetary gear bolt, wherein the planetary gear is in engagement both with the sun gear and with the hollow gear,
wherein the bearing assembly comprises a first planetary gear receiving bushing and a second planetary gear receiving bushing, which planetary gear receiving bushings are coupled to the planetary gear in a rotationally secure manner and between which planetary gear receiving bushings an axial bearing gap is formed and the bearing assembly comprises at least one bearing running sleeve, which is mounted on the planetary gear bolt in a rotationally secure manner and on which an axial positioning flange is formed, which is mounted in the axial bearing gap between the planetary gear receiving bushings and in this way an axial position fixing, in particular an axial bearing, of the planetary gear on the planetary gear bolt is carried out.

2. The planetary gearing as claimed in claim 1, wherein the bearing assembly also comprises a first radial sliding bearing bush which is mounted in a rotationally secure manner in the first planetary gear receiving bushing and comprises a second radial sliding bearing bush which is mounted in a rotationally secure manner in the second planetary gear receiving bushing, wherein the first and the second radial sliding bearing bush have a sliding surface for relative movement on a contact surface with the bearing running sleeve.

3. The planetary gearing as claimed in claim 1, wherein the bearing assembly comprises a first axial sliding bearing disc which is arranged between the first planetary gear receiving bushing and axial positioning flange of the bearing running sleeve and the bearing assembly comprises a second axial sliding bearing disc which is arranged between the second planetary gear receiving bushing and axial positioning flange of the bearing running sleeve.

4. The planetary gearing as claimed in claim 3, wherein the first axial sliding bearing disc is secured by a fastener onto the first planetary gear receiving bushing and the second axial sliding bearing disc is secured by the fastener onto the second planetary gear receiving bushing.

5. The planetary gearing as claimed in claim 1, wherein the planetary carrier comprises a second bolt receiving element, on which at least one second bolt seat is formed, wherein the planetary gear is arranged on the planetary gear bolt between the first bolt seat and second bolt seat.

6. The planetary gearing as claimed in claim 1, wherein the bearing running sleeve comprises a first bearing running sleeve part and a second bearing running sleeve part, wherein on one of the two bearing running sleeve parts the axial positioning flange is formed on the end face and the two bearing running sleeve parts are positioned relative to one another so that the axial positioning flange is arranged in the interior between the two bearing running sleeve parts.

7. The planetary gearing as claimed in claim 1, wherein at least one of the planetary gear receiving bushings comprises an end face graduation which forms the axial bearing gap, wherein the two planetary gear receiving bushings contact one another at their end faces.

8. The planetary gearing as claimed in claim 1, wherein in the planetary gear bolt at least one lubricant inlet is formed, which is guided out of the planetary gear bolt in the area of the bearing running sleeves and also at least one lubricant outlet is formed in the planetary gear bolt, which lubricant outlet opens in the area of the axial positioning flange into the planetary gear bolt.

* * * * *